(12) United States Patent
Ichikawa

(10) Patent No.: US 6,870,528 B2
(45) Date of Patent: Mar. 22, 2005

(54) PORTABLE MOBILE UNIT

(75) Inventor: Atsushi Ichikawa, Tsukuba (JP)

(73) Assignee: Hitachi, Ltd., Tokyo (JP)

(*) Notice: Subject to any disclaimer, the term of this patent is extended or adjusted under 35 U.S.C. 154(b) by 866 days.

(21) Appl. No.: 09/793,527

(22) Filed: Feb. 27, 2001

(65) Prior Publication Data

US 2002/0069231 A1 Jun. 6, 2002

(30) Foreign Application Priority Data

Dec. 6, 2000 (JP) ........................................ 2000-376565

(51) Int. Cl.⁷ .............................................. G09G 5/00
(52) U.S. Cl. ......................... 345/171; 345/168; 341/28; 708/146
(58) Field of Search ................................ 345/168, 169, 345/171; 341/28; 708/145, 146; 400/484

(56) References Cited

U.S. PATENT DOCUMENTS 6,275,216 B1 * 8/2001 Kitamura .................... 345/171

FOREIGN PATENT DOCUMENTS

| JP | 11015584 | | 1/1999 | |
|----|----------|---|--------|---|
| JP | 2001-5589 | | 1/2001 | |
| JP | 2001-28621 | | 1/2001 | |
| JP | 2001265502 A | * | 9/2001 | ........... G06F/3/033 |
| JP | 02001265503 A | * | 9/2001 | ........... G06F/3/033 |

* cited by examiner

Primary Examiner—Amare Mengistu
(74) Attorney, Agent, or Firm—Antonelli, Terry, Stout & Kraus, LLP

(57) ABSTRACT

A portable mobile unit, comprising: an input portion for inputting a letter or a numeral therethrough, wherein the input portion has at least fourteen (14) pieces of input keys; five (5) alphabetic letters of indicative vowels of Japanese language are assigned to five (5) input keys of said fourteen (14) pieces of input keys; and nine (9) alphabetic letters indicative of un-voiced consonants in consonants of Japanese language are assigned to nine (9) input keys, whereby an input of a voiced consonant or a half-voiced consonant is conducted by using an input key for use in inputting other consonant. With this, there is provided the portable mobile unit, which enables the input of Japanese language is possible even with a small number of key operations, in the manner similar to that of the Roman letter input method of Japanese language, with ease.

12 Claims, 11 Drawing Sheets

FIG. 10(a)     FIG. 10(b)
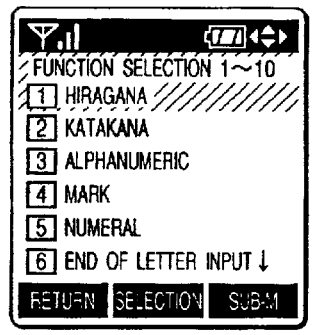
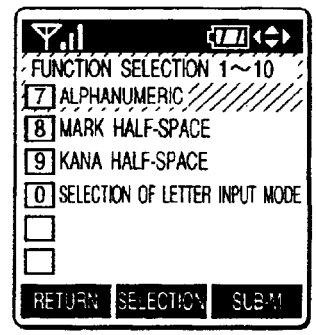
FIG. 11(a)     FIG. 11(b)     FIG. 11(c)
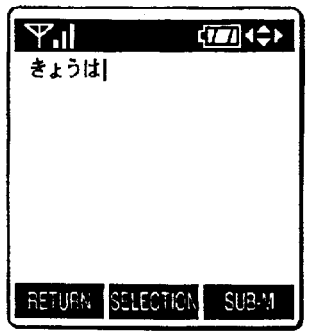
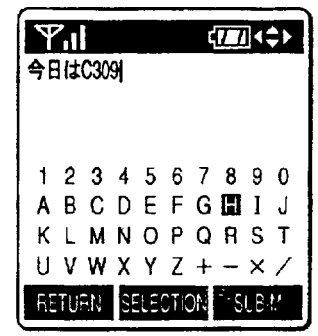

FIG. 12

| CLASS | KIND | CONTENTS |
|---|---|---|
| LETTER INPUT BY KEY | HIRAKANA KATAKANA | 50 SOUND<br>VOICED SOUND, SEMI-VOICED SOUND, CONTRACTED SOUND, DOUBLE CONSONANT |
| | MARK | ｡ , ､ , ( . ), — |
| LETTER INPUT BY CURSOR | MARK | +, −, ×, /, =<br>!, ?, #, <, ><br>〒, ^, ", *, ↵ |
| MODE SELECTION BY CURSOR DIAL KEY [Fnc+ DIAL KEY] | MARK [CURSOR INPUT] | SEE ABOVE |
| | LETTER SELECTION [KEY INPUT] | HIRAKANA (FULL, HALF-SPACE)<br>KATAKANA (FULL, HALF-SPACE)<br>ALPHANUMERIC (FULL, HALF-SPACE)<br>NUMERAL (FULL, HALF-SPACE) |
| | MODE SELECTION | LETTER INPUT MODE<br>END INPUT |

FIG. 13

| INPUT KEY | CONTENTS |
|---|---|
| Fnc+1 | HIRAKANA (FULL-SPACE) |
| Fnc+2 | KATAKANA (FULL-SPACE) |
| Fnc+3 | ALPHANUMERICAL (FULL-SPACE) |
| Fnc+4 | MARK (FULL-SPACE) |
| Fnc+5 | NUMERAL (FULL-SPACE) |
| Fnc+6 | END OF INPUT |
| Fnc+7 | MARK (HALF-SPACE) |
| Fnc+8 | ALPHANUMERIC (HALF-SPACE) |
| Fnc+9 | KATAKANA (HALF-SPACE) |
| Fnc+0 | SELECTION OF LETTER INPUT MODE |

FIG. 14

| NO. | KIND OF LETTER/MARK | INPUT MODE | INPUT EXAMPLE |
|---|---|---|---|
| 1 | VOWEL SOUND | SAME TO ALPHANUMERIC INPUT | a→あ |
| 2 | UN-VOICED CONSONANT | SAME TO ALPHANUMERIC INPUT | ka→か |
| 3 | HALF-VOICED CONSONANT | SAME TO ALPHANUMERIC INPUT | pa→ぱ |
| 4 | VOICED CONSONANT | CORRESPONDING UN-VOICED CONSONANT+P | kpa→が |
| 5 | CONTRACTED CONSONANT OF UN-VOICED CONSONANT | SAME TO ALPHANUMERIC INPUT | kya→きゃ |
| 6 | DOUBLED CONSONANT OF UN-VOICED CONSONANT | SAME TO ALPHANUMERIC INPUT | kka→っか |
| 7 | CONTRACTED CONSONANT OF HALF-VOICED CONSONANT | SAME TO ALPHANUMERIC INPUT | pya→ぴゃ |
| 8 | DOUBLED CONSONANT OF HALF-VOICED CONSONANT | SAME TO ALPHANUMERIC INPUT | ppa→っぱ |
| 9 | CONTRACTED CONSONANT OF VOICED CONSONANT | CORRESPONDING UN-VOICED CONSONANT+p+VOWEL | kpya→ぎゃ |
| 10 | DOUBLED CONSONANT OF VOICED CONSONANT | CORRESPONDING UN-VOICED CONSONANT+p+CORRESPONDING UN-VOICED CONSONANT+p+VOWEL | kpkpa→っが |
| 11 | DOUBLED CONSONANT OF VOICED CONSONANT + CONTRACTED CONSONANT | CORRESPONDING UN-VOICED CONSONANT+p+ CORRESPONDING UN-VOICED CONSONANT+p+y+VOWEL | kpkpya→っぎゃ |
| 12 | LONG VOWEL "—" | CONTINUE FUNCTION KEY Fnc14 2 TIMES | |
| 13 | COMMA "、" | SOFT KEY L19 | |
| 14 | PERIOD "。" | SOFT KEY L20 | |
| 15 | START BRACKET "{" | CONTINUE SOFT KEY L19 2 TIMES | |
| 16 | END BRACKET "}" | CONTINUE SOFT KEY L20 2 TIMES | |

FIG. 15

| NO. | FUNCTIONS | KEY OPERATION |
|---|---|---|
| 1 | INSERT OF SPACE | DETERMINE POSITION OF CURSOR BY (FUNCTION KEY Fnc14+←16 OR→17+DECISION KEY Ent18), AND SHIFT THE CURSOR BY (→17+DECISION KEY Ent18), THEN SPACE APPEARS IN THE PORTION WHERE THE CURSOR PASSES THROUGH |
| 2 | DECISION OF INPUTTED KANA LETTER | DECISION KEY Ent18 |
| 3 | KANJI CONVERSION OF KANA LETTER | CONTINUOUSLY 2 TIMES OF DECISION KEY Ent18 |
| 4 | AREA ASSIGNMENT BY CURSOR | DETERMINE RESPECTIVE BOUNDARY BY (FUNCTION KEY Fnc14+←16 OR→17+DECISION KEY Ent18), AND SET AREA BY 2ND INPUT |

PORTABLE MOBILE UNIT

BACKGROUND OF THE INVENTION

1. Technical Field of the Invention

The present invention relates to a portable mobile unit, with which inputting of letters or characters is conducted by using input-keys, and in particular to a portable mobile unit, being suitable for easiness of Japanese language input, when using the numeral-keys as the input keys thereof.

2. Description of Related Art

Input and output function of a portable telephone apparatus, as a representative example of the portable mobile unit, becomes more and more important when the Internet function is added to the portable telephone apparatus. However, a method for inputting Japanese language cannot be said to be easy to handle. With a means for inputting Japanese language, a standard method is determined relating to a Japanese language word processor apparatus (including a personal computer installing a software of Japanese language word processor therein) (hereinafter, called by "word processor"), and many peoples are familiar with that process and come to have a skill of inputting it at high speed. In the word processor, the functions are distributed to a hundred (100), more or less, of the key switches, however in the portable telephone apparatus and/or the portable codeless telephone apparatus, since the apparatus itself is small in the sizes, there are provided only around twenty (20) of the key switches. Therefore, in the portable telephone apparatus, the functions of several keys of the word processor must assigned to one key thereof, and has a problem that it requires a troublesome operation for inputting the Japanese language therewith.

In a user's manual of the portable telephone apparatus, there are described three methods, i.e., (1) dial-cursor input, (2) dial-key input, and (3) letter or character code input, as representative ones thereof. The (1) dial-cursor input is a method, wherein letters or characters are selected by means of the cursor among the letters indicated on a display, and also an adjustment, such as a sonant mark, etc., is made by selecting the content shown in other part of the display through the cursor, thereby selecting. This method has an advantage that it can be easily understood, since the operation can be carried out while being visually ascertained the contents thereof and there is no other matters to remember further if it is learned once. The (2) dial-key input is a method, wherein the each key is pushed down repeatedly until the letter assigned to it appears, and it is a basic input method for the portable telephone apparatus. This method is common with for all kinds of machines and is applicable in almost all modes thereof since the input can be conducted by means of the dial keys. However, as the input method of the letters or characters, it has a drawback by itself that key operations comes to be large in number thereof, on an average. The (3) letter code input is a method, wherein a letter code of two (2) digits is inputted after selecting the kind of the input, such as kana (the Japanese syllabary) or English and numeral letter, and this is widely used in a pager, etc. It has a drawback that the letter codes must be memorized in advance, and so on.

An example other than the above is described in Japanese Patent Laying-Open No. Hei 11-15584 (1999), wherein twelve (12) pieces of dial keys of the telephone apparatus are classified into separate keys, each being used at high frequency and assigned with a separate alphabet thereto, and code keys, with which an alphabet is determined by pushing down a plural number of keys thereof, and alphabets are inputted by combining those keys, so that a sentence inputted is converted into Japanese.

Among those above-mentioned conventional arts from (1) to (3), the (2) and (3) are desired to be installed into the apparatus as the common technologies shared with the other kinds of machines, and as a new technology in the place of the (1) or in addition thereto, it is an object to make the input of Japanese language easy much more. For achieving this object, as was mentioned in the above, such a method is preferable, having as many aspects as possible in common with the input methods, which are practiced widely in the word processor, etc. From this viewpoint, it is an object to realize an input method of alphabetic letters or character, which can be used widely as the Japanese language input method and also can be done with using letters (i.e., keys) as small as possible in the number, however with changes therein as small as possible. For such the implicit object of this, there is a necessity of making the number of key operations necessary for inputting a consonant be only two (2) times or less than that. In addition to fulfilling such the object mentioned above, it is also important object to provide the input method, in which the input of a mark being generally used, as well as, exchange of the letters, can be performed with a simple and common method.

SUMMARY OF THE INVENTION

An object of the present invention is to provide a portable mobile unit, wherein, although the numeral keys are mainly used as the input keys, the alphabetic (or Roman) letter input of Japanese language is possible with a small number of key operations, therefore being easy to handle with.

According to the present invention, upon the basis of the alphabetic letter input method of Japanese language, the input of the voiced consonant or the half-voiced consonant can be easily conducted by using the input key for use in the input of other consonant, even with a small number of the input keys, in the manner similar to the alphabetic letter input method of Japanese language, thereby achieving the object mentioned above.

In more details, for achieving the object mentioned above, according to the present invention, there is provided a portable mobile unit, comprising: an input portion for inputting a letter or a numeral therethrough; a display portion for displaying letter information including the numeral inputted through said input portion; a processing portion for processing the information including that from said input portion, and for outputting information to said display portion; and a memory portion for storing data necessary for the processing in said processing portion, wherein:

said input portion has at least fourteen (14) pieces of input keys;

five (5) alphabetic letters of indicative vowels of Japanese language are assigned to five (5) input keys of said fourteen (14) pieces of input keys; and nine (9) alphabetic letters indicative of un-voiced consonants in consonants of Japanese language are assigned to nine (9) input keys, further comprising:

an input key, being assigned with one of the alphabets indicative of the un-voiced consonants in the consonants of Japanese language and a function of bringing the un-voiced consonant into a voiced consonant, wherein:

input of the voiced consonant is conducted by combining the alphabetic letter indicative of said un-voiced consonant, the alphabetic letter assigned to said function of bringing into a voiced consonant, and the alphabetic letter indicative of said vowel.

According to the present invention, it is possible to conduct the alphabetic letter input of Japanese language with the less number of the key operations, thereby obtaining the portable mobile unit which can be used easily.

BRIEF DESCRIPTION OF THE DRAWINGS

FIG. 10 is a view showing a display screen for a selection of letter mode, according to the first embodiment of the present invention;

FIG. 11 is a view showing an example of input by means of the quasi-Roman letter input method, according to the first embodiment of the present invention;

FIG. 12 is a view showing the contents of a letter input process, according to the first embodiment of the present invention;

FIG. 13 is a view showing a table of modes, which can be selected by a combination between a function key and a numeral key, according to the first embodiment of the present invention;

FIG. 14 is a view showing kinds of the letters and marks and the input methods thereof, according to the first embodiment of the present invention; and FIG. 15 is a view showing each of the function and the key operations thereof, according to the first embodiment of the present invention.

DETAILED DESCRIPTION OF THE INVENTION

Figure 1:
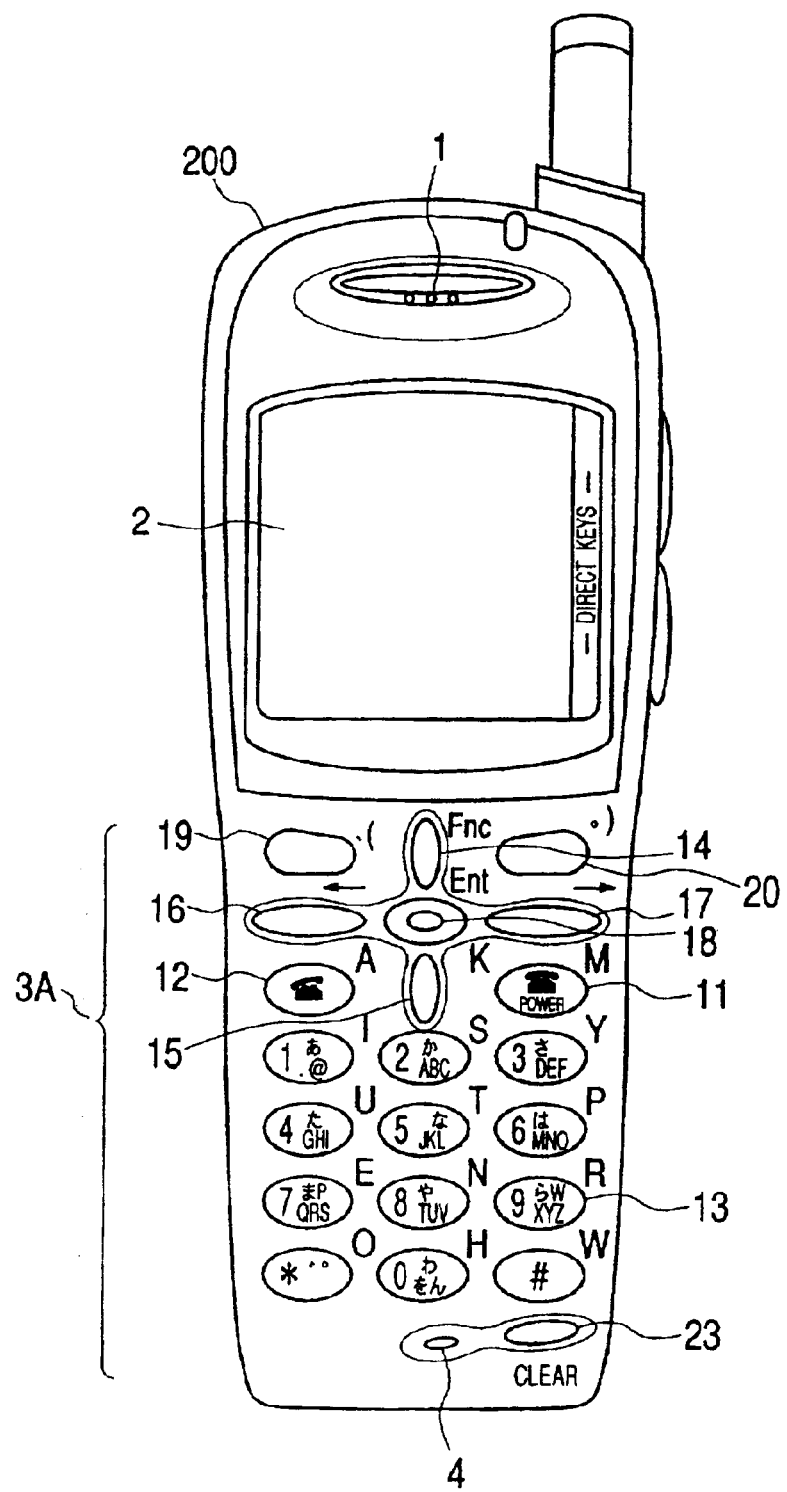
FIG. 1 is a front view showing distribution of letters or character onto keys of a portable mobile unit, according to a first embodiment of the present invention.

Hereinafter, embodiments according to the present invention will be fully explained by referring to the attached FIGS. 1 to 15. The present embodiment shows an example, in which the present invention is applied into a portable telephone apparatus 200. In recent years, the portable telephone apparatus comes to be so-called a multi-function terminal device, which installs not only the function as a movable or mobile telephone apparatus, but also a function as the Internet terminal, as well as an entertainment function, such as, reproducing high sound quality melody of a telephone call or a game machine. The portable telephone apparatus 200 according to the present embodiment also has such the functions as mentioned above. An outlook is shown in FIG. 2. Upon a front surface, there are disposed a receiver (or an ear speaker) 1, a display 2 using a color LCD, key switches 3A, and a mouthpiece (or a microphone) 4, in an order from the top thereof, and a light emitting diode 5 is disposed at the right-front in an upper portion thereof. On a rear surface, not shown in the figure, are disposed a high sound-quality speaker on an opposite surface of the LCD display 2, and a battery on an opposite surface of the key switches 3A, while at the left-hand side of the rear surface is disposed an antenna 6. On the lower and side surface are disposed the following external connector terminals; surface key switches on the right-hand side, through which an operator can determined the functions thereof, and a switch for exchanging the mode thereof on the left-upper side surface.

The functions, which the portable telephone apparatus 200 has, can be divided roughly into, i.e., a basic function of the telephone apparatus, a homepage browser function for use in the Internet, an electronic mail (e-mail) function, a music reproducing function, a game function, etc. For the purpose of obtaining the Internet function and/or the music reproducing function more effectively, the LCD display is widened in the display surface thereof and colorized, and also the apparatus comprises the high sound-quality speaker being larger than the receiver 1 for use of telephone conversation.

Selection of those functions is performed by means of key switches 3A. A power on/off key 11, a send (transfer) key 12 for exchanging between ON and OFF in hook of the telephone apparatus, and dial keys 13 including numerical keys similar to those of a push-phone apparatus and mark or symbol keys, such as "*" and "#", construct the basic function switches. As keys for selecting an icon indicated on the display 2, for the purpose of using the large number of functions mentioned above, there are provided keys 14, 15, 16 and 17 for shifting a cursor displayed in the directions of up and down and of left and right, and a decide key (an enter key) 18. Also, as keys for setting the functions having high frequency in uses thereon, so as to initiate them directly, there are also provided soft keys L19 and R20, and direct keys A21 and B22.

Figure 3:
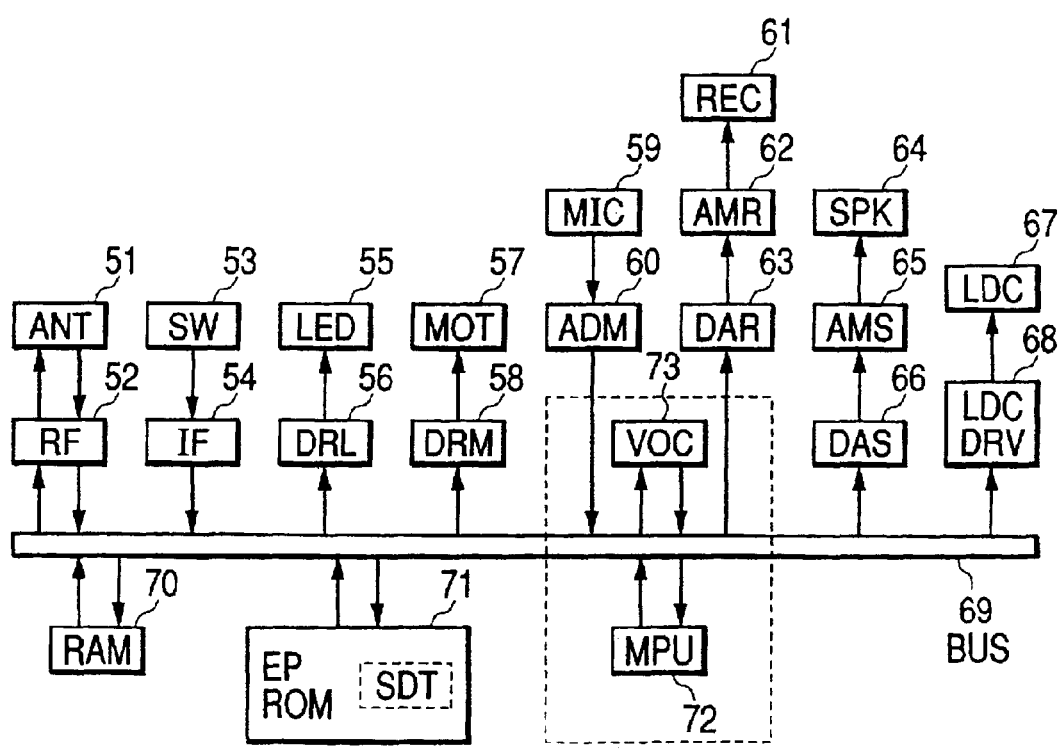
FIG. 3 is a function block diagram of the portable mobile unit, according to the first embodiment of the present invention.

Explanation will be given on the circuit block diagram of the portable telephone apparatus 200, by referring to FIG. 3. An antenna ANT51 and a high frequency circuit RF52 provide a communication function. The high frequency circuit RF52 has: a base-band processing function for extracting codified digital information from a radio wave received by the antenna ANT51, and a transmission function for converting and amplifying the codified information into information for use in transmission. The high frequency circuit RF52 carries out inputting/outputting of signals between an interface bus BUS69. Voices of an user is converted into an analogue electric signal through a mouthpiece (microphone) MIC59, and is further converted into a digital signal through an analog-digital converter ADM60, to be transferred to an interface bus BUS69. This information is compressed into minimum amount of necessary digital information, in a voice converter VOC73 that is constructed in a form of a program within a microcomputer. Also, the voice converter VOC73 converts the digital signal, which is converted from the voices and received through the interface bus BUS69, into analog signal, and drives the receiver REC61 through an amplifier AMR62. An ON/OFF condition of the key switch is converted into digital signal through a switch interface IF53, and is transferred to the microcomputer MPU72 through the interface bus BUS69. As the LCD display 2 is used a liquid crystal panel LDC62, and the signal for use of information display, which is outputted from the microcomputer MPU72, is supplied to a liquid crystal driver LDCDRV68, whereby it is converted into signal for use in liquid crystal panel in the liquid crystal driver LDCRV68, so as to drive the liquid crystal panel LDC62, therefore the signal is displayed on the liquid crystal panel LCD62 as the information. When receiving a telephone call or an electronic mail, a driving signal is inputted into a light emitting diode driver DRL56 or/and a motor driver DRM58 from the microcomputer MPU72 through the interface bus BUS69, thereby making the light emitting diode LED55 flash or the motor MOT69 rotate thereby to operate a vibrator. A combination of those operations and/or each of the operation patterns are memorized in a semi-static memory EPROM71 in a form of data for use in control. For alarming an incoming of telephone call, not such a simple sound as a buzzer sound of the conventional art, but it comes to be common to sound a music comfortable on hearing, and in the present embodiment, for that purpose, the speaker SPK64 (the high sound-quality speaker) is used, which is superior in a sound reproduction characteristic thereof. As a circuit for driving the speaker SPK64, a digital-analog converter DAS66 and an amplifier AMS65 are provided. Control programs and various data for operating those constituent elements mentioned above are memorized in the semi-static memory EPROM71 that can hold the memory even in non-conduction of electricity thereto. While the information is memorized in a random memory RAM70, being necessary for a contemporary processing.

Next, explanation will be given on the functions of the portable telephone apparatus 200. The basic function of the portable telephone apparatus 200 includes a communication function as the portable telephone and a transmission function of the electronic mails. In order to make the large number of settings, which are for easy use of those functions, as well as the memory functions easily understandable, the following functions and steps are set. First of all, depression of the power on/off key makes an initial screen (a waiting screen) appear on the display 2. In this condition, after inputting the telephone number of a person to be addressed through the dial keys 13, depressin of the send key 12 enables the user to make a telephone call. Also, when it receives the telephone call from a calling person, the said portable telephone apparatus executes the following operations; such as, bringing the arrival lamp 5 to flash out, initiating the vibrator to operate, or sounding the arrival melody from the high sound-quality speaker, etc., and when the user depresses the send key 12, the receiver 1 (i.e., the speaker) sounds voices of the talking person while the microphone 4 inputs the voices of the user.

Figure 4:
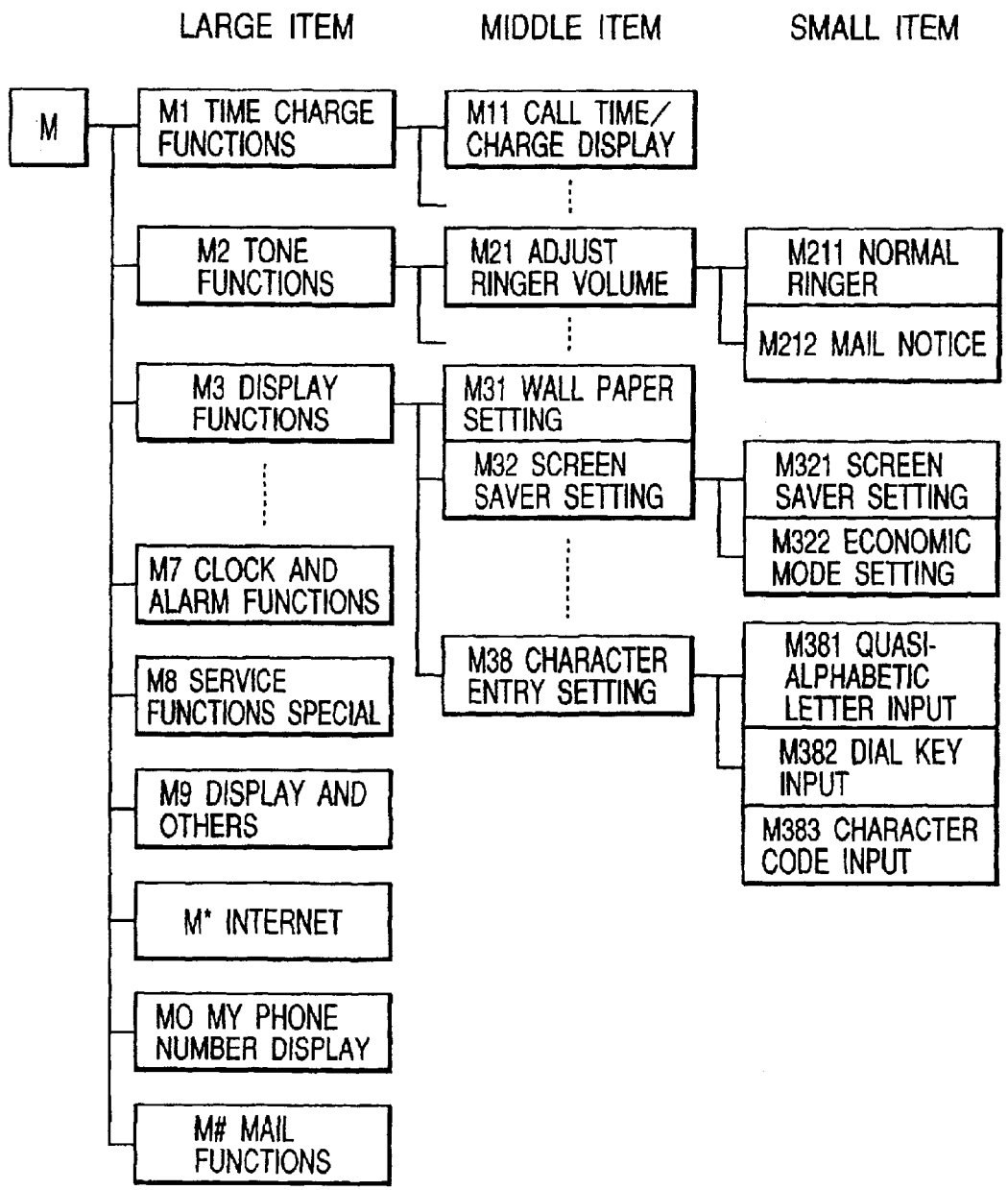
FIG. 4 is a view of the structure of function menus, according to the first embodiment of the present invention.

In the present embodiment, the various functions of the portable telephone apparatus 200 can be set with through a menu method. The structure of the menu function has a hierarchical structure, as shown in FIG. 4. In the initial condition, the display 2 changes into a menu screen when the decide (enter) key 12 is depressed. The menu screen has twelve (12) icons aligned thereon, and thereby a desired function group can be selected by depressing a one of the twelve (12) dial keys having the same positional relationships to those.

Next, explanation will be given on a letter or character input system in the portable telephone apparatus 200, in more details thereof. The portable telephone apparatus 200 according to the present invention has three (3) modes or methods; a first one as the letter input system is a dial key method, a second one a letter code method, and as a third one a letter input method according to the alphabetic letter input method.

In the dial key mode of the first one, the sound at the top of an each line of fifty (50) sounds (10 lines) of Japanese alphabetic letters from 「あ(a)」 to 「わ(wa)」 are assigned to each of the dial keys "1" to "0", respectively, and other than those are assigned 「を(wo)」 and 「ん(nn)」 to the dial keys "0". For example, if trying to input 「つ(tu)」, since a vowel sound of 「つ」 is 「う(u)」 and it is on third column from the top of 「あ(a)」, the key assigned with 「た(ta)」 (i.e., the key "4") must be depressed down three (3) times.

In the letter code mode of the second method, a code is keyed in, which is predetermined in advance for each of Japanese alphabetic letters. In this method, distinction is made first between a capital letter and a small letter, and thereafter the input of the letters is carried out. The letters are aligned of the fifty (50) sounds, in vertical lines with positioning the vowel 「あ(a)」 at the top of a first line, and supplemental marks are added thereto, wherein the number of tens of a two-digit code indicates the line in the vertical direction and the number of units a column. For example, 「でんわ(dennwa: telephone)」 can be inputted by pushing down the keys "44040301" in total, since 「で(de)」 can be inputted by a code "44" indicating fourth ($4^{th}$) sound of a line of 「た(ta)」 and a code "04" indicating a sonant mark following thereto, i.e., "4404", 「ん(nn)」 by a code "03", and 「わ(wa)」 by a code "01", respectively. However, in any way of those, the input must be made by imaging a code table in the mind, therefore it is difficult work for a person not familiar therewith.

Then, in the letter input mode according to the alphabetical letters of the third method (hereinafter, a quasi-alphabetic or quasi-Roman letter input mode), an input method is applied, which is near to the alphabetical letters used in the word processor available in common. In this third method, for lowering the number of alphabets used smaller, there is applied a rule being partially different from the conventional alphabetic letter input method when describing Japanese words by the alphabetical letters.

Figure 5:
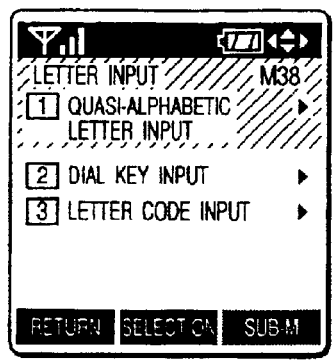
FIG. 5 is a view showing a selection screen for a method for inputting letters, according to the first embodiment of the present invention.
Figure 6:
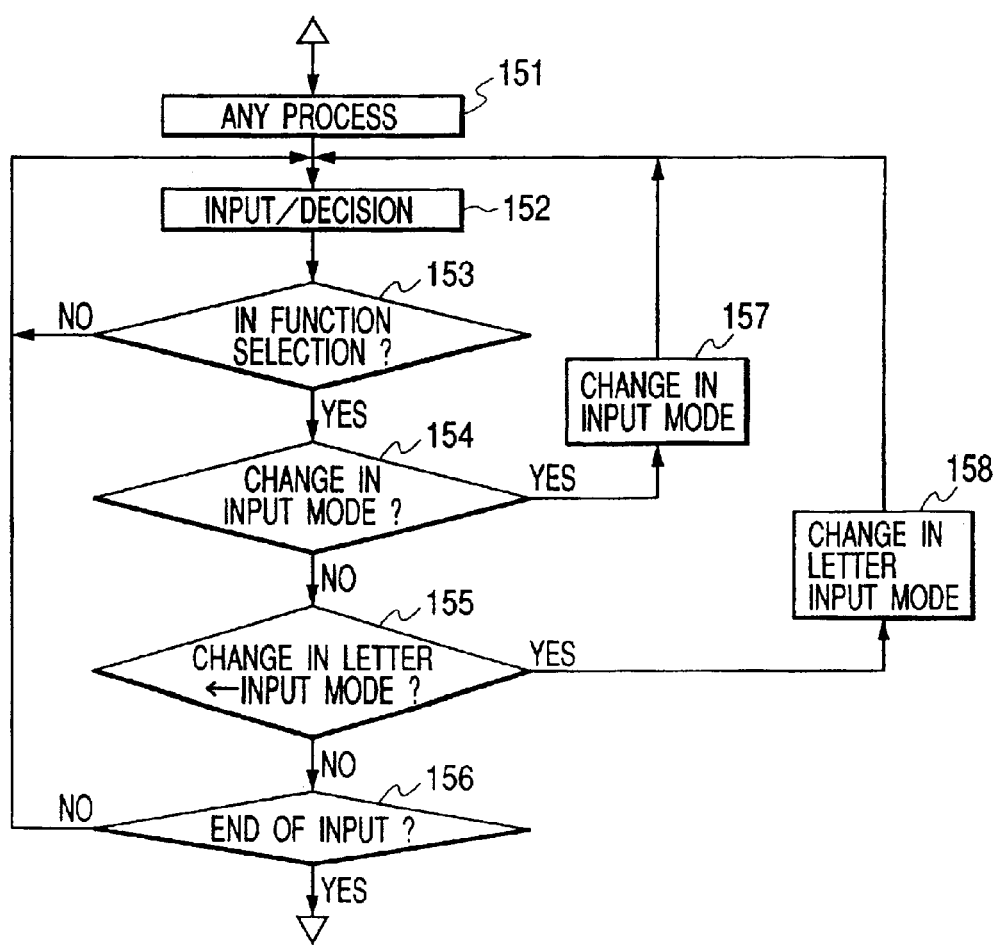
FIG. 6 is a flowchart relating to function selection by a function key Fnc 14, according to the first embodiment of the present invention.

In the portable telephone apparatus according to the present invention, so as to select the letter input method, an input is made by the key "M38" under the waiting condition or by the key corresponding thereto on the menu selection screen, then the selection screen of the letter input method is displayed, as shown in FIG. 5. In the FIG. 5, "1" indicates the quasi-Roman letter input method of the third method, "2" the dial key input mode of the first method, and "3" the letter code input mode of the second method. In this condition, when the arrow key 14 in an up direction or the arrow key 15 in a down direction is inputted, so as to shift the cursor to a position for the letter input method desired, and the decide key 18 is inputted, then the letter input method is changed to the one which is selected, and thereafter the letter input is possible in accordance with that selected mode. When "1" is selected on the screen for selecting the letter input method and the decide key is inputted, it is changed into the quasi-Roman letter input mode. After conducting the change into the quasi-alphabetic (or -Roman) letter input, during that quasi-alphabetic letter input, any one of the processes is conducted (151) and a key input is conducted (152), and then a determination is made whether the process relates to the processing or not (153), whether it changes the letter mode or not (154), whether it changes the letter input mode or not (155), and whether the input is completed or not (156), thereafter it turns back to the next key input. The function selection relates to the letter mode selection for selecting among the inputs of marks, kana (Japanese alphabets), and alphabetic and/or numeral (alphanumeric) letters, and/or to the completion of the input, etc. The function selection is determined by the function key Fnc14 and the input key(s) following thereto. When the input relates to the function selection (151-yes), the function is selected by the input made next to that. In a case where the input relates to the letter mode (154-yes), it is changed into the selected letter mode (i.e., hirakana, katakana (both the Japanese alphabets) and English letters and numerals), and the letters are inputted in accordance with the new letter mode, from the next input. In a case where the input is for selecting the letter input mode (155-yes), it returns back to the screen for the letter input, which is same to that when "M38" is inputted under the above-mentioned waiting condition. Also, in a case where the letter input is completed (156-yes), the input letter determined is memorized into the contemporary memory, and thereafter it turns back to the condition where the letter input is started. Summarizing the above, it is shown in FIG. 12.

Next, explanation will be given on conversion processes of kana (Japanese alphabets) in the quasi-alphabetic letter input mode, by referring to FIGS. 7 to 9. Since the number of the keys of the portable telephone apparatus 200 is twenty-two (22), it is impossible to assign the letters of alphabets and/or the marks, which are used at high frequency, to each one of the keys, respectively, like in the word processor. Then, the alphabets are assigned to the keys in the following principal, by taking the characteristics of pronunciations of the Japanese language into the consideration, in the present embodiment:

(1) vowels "a, i, u, e, o";

(2) consonants of unvoiced consonants "k, s, t, n, h, m, y, r, w";

(3) half-voiced consonants "p";

(4) decide "Ent";

(5) function "Fnc";

(6) arrows "→, ←";

(7) punctuations ".,,"; and (8) clear.

Figure 2:
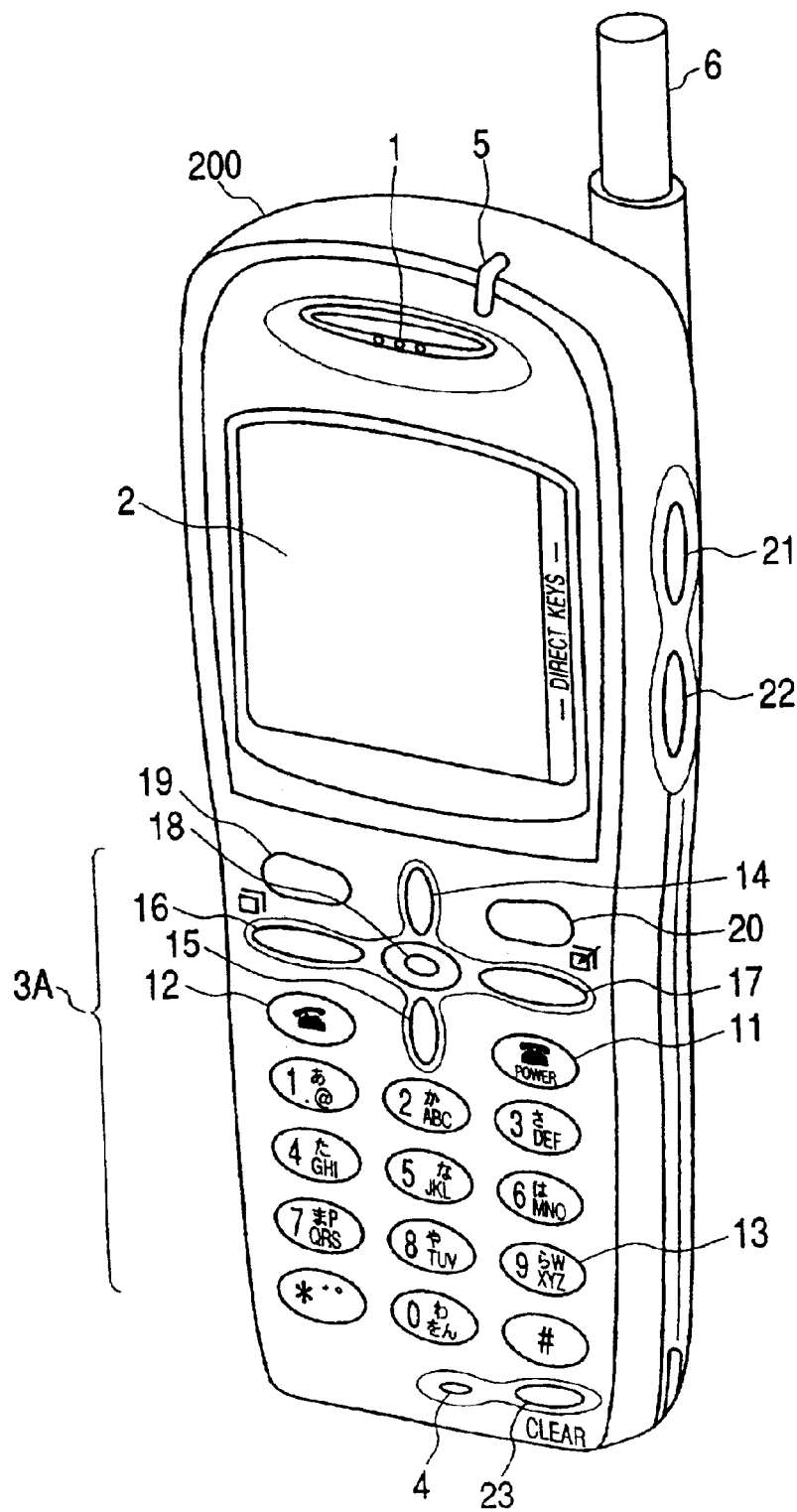
FIG. 2 is a perspective view of the structure of the portable mobile unit, according to the first embodiment of the present invention, being seen obliquely from a right-upper side in front.

To the twenty-two (22) keys mentioned above are assigned the alphabets at the right-upper portion of each of the keys, as shown in the FIG. 1. In the explanation mentioned in the above, "letter keys" call the keys, to which the alphabets are assigned. Also, when deciding the key inputted next to the function key Fnc14, a "numeral key" calls the key, to which the numeral of the dial key is assigned. Therefore, the key, to which both the alphabet and the numeral are assigned, may be called by separate names in the explanations given below, depending upon the situation thereof, even if they are the same key. Only the clear key is used, as is used originally. The fifteen (15) keys including those for the vowels and the consonants are arranged in a form, so that three pieces are added onto the twelve (12) pieces of the dial keys, wherein the five (5) pieces of the vowels are disposed in a vertical line at the left-hand side end while ten (10) pieces of the consonants are in two lines at the right-hand side end. With such the disposition, the positional difference between the consonants and the vowels can be grasped, easily. In an ordinal table of the fifty (50) sounds, there is not included the line for "p", nor a standard for directly deciding the position thereof where it should be disposed, however according to the present embodiment, it is disposed at the position on the right-hand line and at the height of a center thereof, for satisfying the requirements of a less amount of shifting of a finger and easy understanding of the position thereof when inputting a voiced consonant, which will be mentioned latter. With the function keys other than the alphabets, the decide key 18 is used as was originally used, and the cursor keys are used as the arrow keys 16 and 17, corresponding to the directions of the arrows. The function selections is assigned to a central key 14 in the most upper line, and to the remaining two (2) keys 19 and 20, are assigned with the marks, which are used at high frequency of use, such as the punctuation marks and brackets. The keys relating to the basic functions of the telephone apparatus must be positioned in common to those in the other portable telephone apparatus. Therefore, the indication relating to the quasi-alphabetic letter input is made off the key in the right-upper direction for each of the keys, for example.

Next, a method of Japanese language input in the present embodiment will be explained, by referring to FIGS. 7 to 9 and FIGS. 13, 14 and 15.

Figure 7:
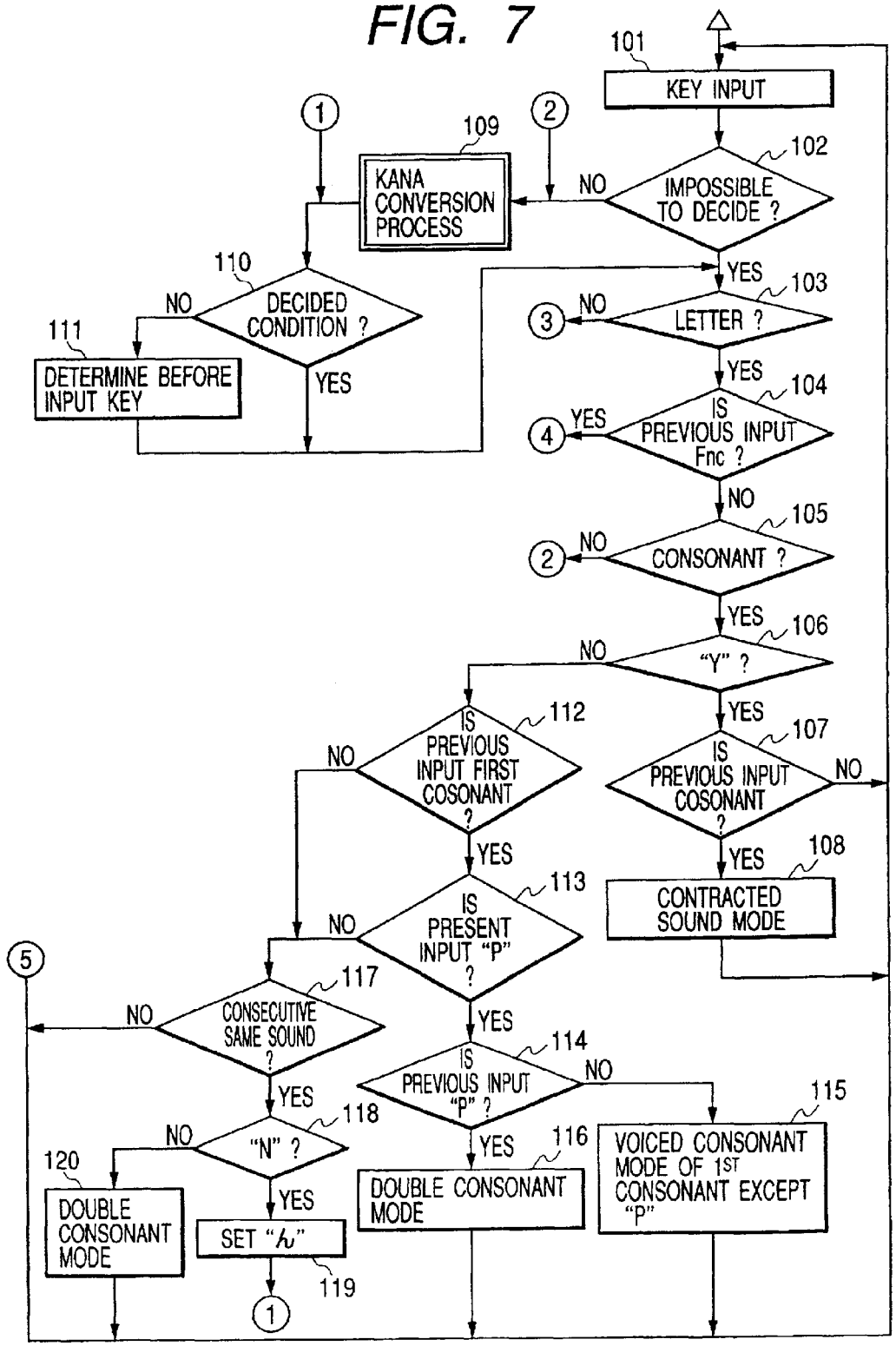
FIG. 7 is a flowchart (1) of a quasi-alphabetic (or -Roman) letter input method or mode, according to the first embodiment of the present invention.
Figure 8:
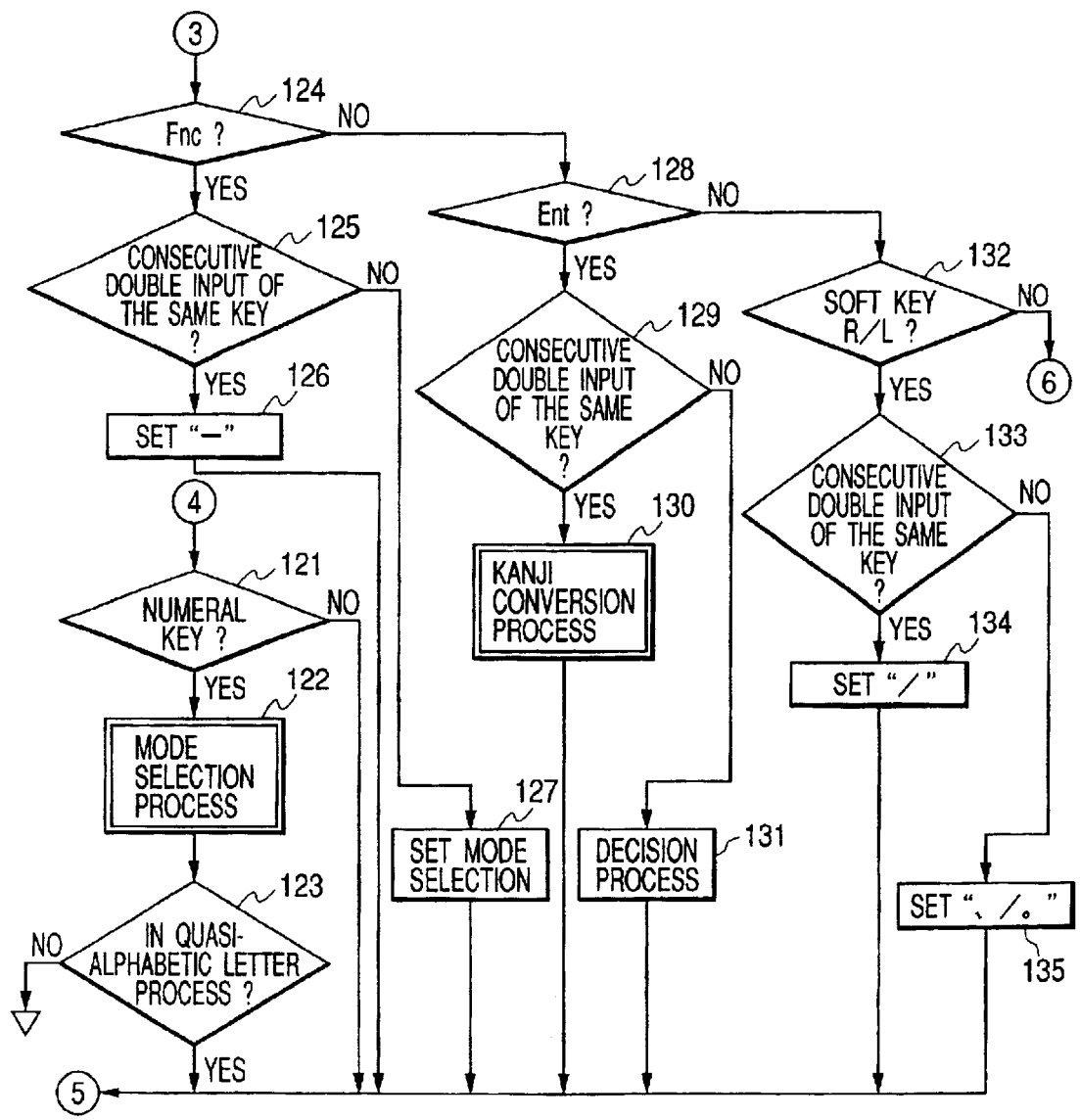
FIG. 8 is a flowchart (2) of the quasi-alphabetic letter input method, according to the first embodiment of the present invention.
Figure 9:
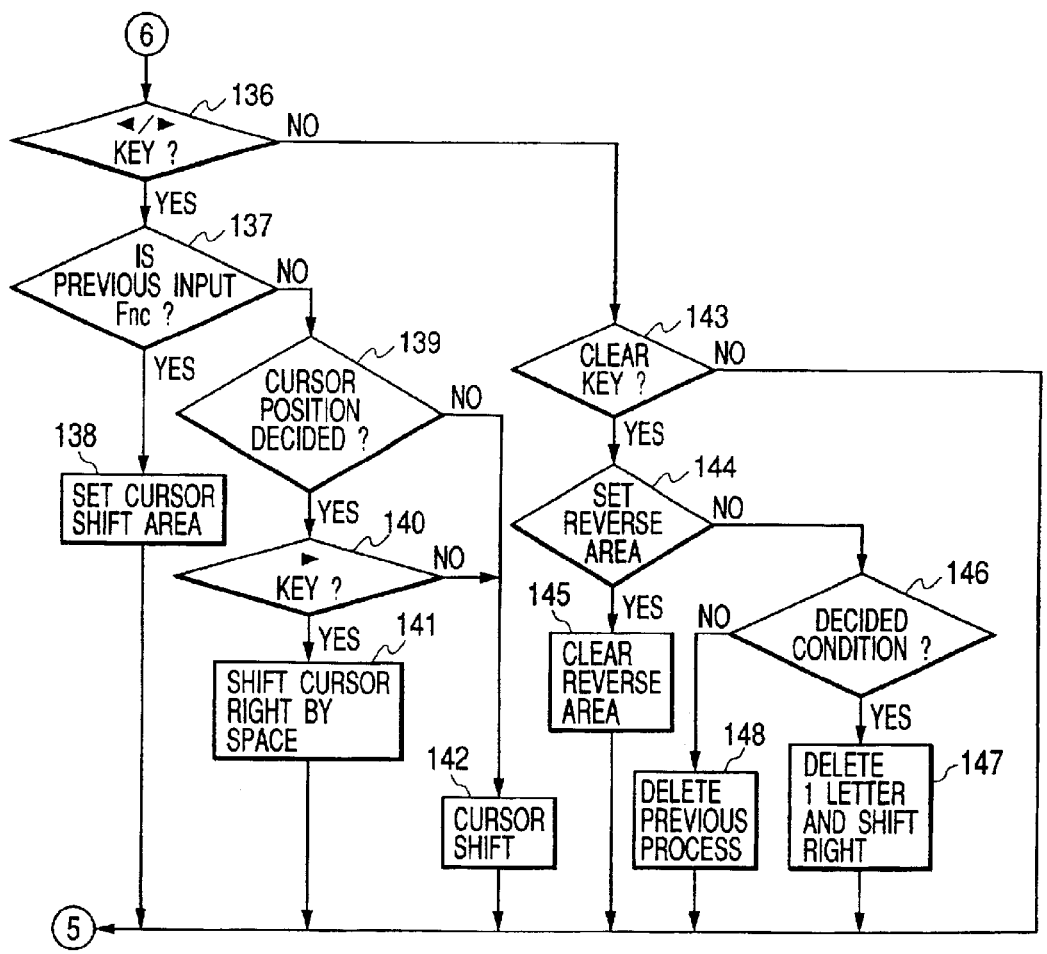
FIG. 9 is a flowchart (3) of the quasi-alphabetic letter input method, according to the first embodiment of the present invention.

Each of FIGS. 7 to 9 shows the flowchart, in a part thereof respectively, and each of symbols, in which the numerals 1 to 5 are marked in circles (hereinafter, connection points 1 to 5), indicates that the same marks are connected to each other. The FIG. 7 shows mainly the conversion into Japanese language when inputting the alphabets, and the FIGS. 8 and 9 the function selection and the input of the marks, mainly.

The input of Japanese language is carried out by the input method, which is shown in the FIG. 14. The basic portions of the input of Japanese language are shown in Nos. 1 to 11 in the FIG. 14. Examples of the input keys and the letter(s) expressed by them are indicated at the tips of arrows, in the columns of the input examples. In the FIG. 14 and the explanations given below, an un-voiced consonant means a consonant, which constructs the un-voiced consonant. The input of the marks, which can be considered to be high in the use frequency other than the basic portions of the Japanese language, such as, a long vowel "-", a comma "," and a period ".", a start of bracket "(" and an end of bracket ")", are conducted by the key operations shown in Nos. 12 to 16 in the FIG. 14, respectively.

Also, various functions, including, such as, insertion of a blank, a decision of kana letters (Japanese alphabets), appointment of an area or region of kana letters by a kanji (Chinese character) conversion cursor, are conducted by the key operations shown in Nos. 1 to 4 in the FIG. 15, respectively.

In the case of the appointment by the cursor, no influence is given onto the contents of processes until when the setting of the area is completed. The area appointed by the cursor is indicated by the letters reversed in black and while. The area appointed by the cursor is processed by the key operation next to the completion of input at the second time, and is cancelled after the process. The appointment of the area cancelled even if the next process is non-sense.

The setting of the quasi-alphabetic (-Roman) letter input mode corresponds to head portions in the FIG. 7. And then, the key inputs are carried out (101). Under the condition where the key inputs are done, if the indication thereof can be determined in "kana" (Japanese alphabetic) letters (102-no), a portion which is inputted but not yet completed on the "kana" conversion, is converted into "kana" letters (109), on the other hand, the portion up to a front of the key inputted is determined if the "kana" indication is not yet determined (110-no), while the process proceeds to a next step (103), as it is, if it is determined (110-yes), and then it is determined whether the key inputted is the letter key (alphabet key) or not. If it is not the letter key (103-no), since it is a function processing or an input of a mark, the process is directed to a separate process block through the connection point 3. If it is the letter key (103-yes), determination is made whether the key inputted before the key-input at this time is the function key Fnc14 or not. If it is the function key Fnc14 (104-yes), since the possibility is high of a mode change, the process is directed to the mode change process through the connection point 4. If the input-key before is not the function key Fnc14, determination is made whether the input-key at this time is a consonant or not (105). When the process reaches to the step (105) passing through the steps (103) and (104), it ought to be the letter input, then determination is made whether it is a consonant or not (105). If the above-mentioned determination is a vowel (105-no), the sound of Japanese language is determined by this input, the process proceeds to the above-mentioned "kana" conversion process (109) through the connection point 2.

The following is the case where the above-mentioned determination is a consonant (105-yes). If the key inputted is "Y" (106-yes), and if the key inputted before this is a consonant (107-yes), the possibility is high of being a contracted sound, the process is set to a contracted sound mode (108) while waiting a vowel ought to be input next. If the key inputted is "Y" (106-yes) and if the key inputted before this is not a consonant (107-no), since the key inputted before this should be a vowel, the "kana" conversion was already made on the portion until the key-input before this, and the "Y" inputted at this time comes to be a head portion of a new sound. If the key-input is not "Y" (106-no), determination is made on whether the key inputted before this is a first consonant or not (112). Herein, the first consonant is a name given to a group of the consonants of un-voiced consonants corresponding to voiced consonants, i.e., "K", "S", "T" and "H", and "P" in addition thereto. If the key inputted before this is the first consonant (112-yes), and if the key inputted at this time is "P" (113-yes), the process is set to a double consonant mode for processing the double consonant upon a vowel ought to be inputted next, when the key inputted before this is "P" (114-yes). And then, the process turns back to the key input. If the key inputted before this is not "P" (114-no), the process is set to a voiced consonant mode for processing the voiced consonants corresponding to the consonants, excepting "P" from the first consonants determined by a vowel ought to be inputted next.

And the process turns back to the key-input. If the key inputted before this is not the first consonant (112-no), determination is made on whether the same key-input is repeated or not at this time (117), and if they are different (117-no), they have a spell of non-sense, then they are remained in the form of the alphabets as they are. The process turns back to the key input, and they are determined as they are when be decided in a next determination thereof. If the key inputted at this time is the same key inputted before this (117-yes), and if the key inputted is "N", it is set to ⌈ん(nn)⌋, passing through the connection point 1, and it will be determined (111) when being decided in the next coming determination thereof. If the key inputted is not "N", the process is set to the double consonant mode for processing the double consonant, which is determined by a vowel to be inputted next. And, the process comes back to the key-input. Turning back before, the key inputted at this time is the first consonant but not "P" (113-no), determination is made on whether the same key is repeated or not (117), as was mentioned before, and thereafter, the same processes after the step (117) are conducted.

Turning back to the case where the key inputted at this time is not the letter key (103-no), explanation will be given on a case different from the mentioned above. The function key Fnc14 performs an important function, such as the functions of non-letter keys. The function key Fnc14 performs the input of the marks, in combination with other key(s), other than the "kana" input explained in the above, or change into other mode(s), etc. The decide key Ent18 performs the determination of the "kana" input, or the conversion into Chinese characters of the words inputted. Under the above mentioned, explanation will be given on a case where the key inputted at this time is the letter key and the key inputted before is the function key Fnc14 (114), first. After the function key Fnc14 is inputted, the screen shown in FIG. 10 is indicated on the display 2. In this instance, if the key inputted at this time through the connection point 4 is the numeral key (inherent a dial key) (121-yes), the process is changed into the mode (122), which is determined by a combination with the function key Fnc14 shown in FIG. 13. The mode, to which the process is changed, is a mode for going out from the quasi-alphabetic letter processing (123-no), a message file inputted is determined under the present condition, to be held or not, and the quasi-alphabetic letter input is completed, thereby being changed to the mode before. If the mode, to which the process is changed, is the mode for changing into the input of marks within the quasi-alphabetic letter input mode or so on (123-yes), the input is made in those modes from the next one. In the mode of katakana (Japanese alphabets) input, the process is basically same as those of the "kana" input mentioned above, and it turns back to the next key-input through the connection point 5.

If the key inputted at this time is not the numeral key (121-no), since it has no function of sense, no process is conducted not processed to an input of the next key through the connection point 5. Next, the process exceeds from the step (103-no) passing through the connection point 3 to a step (124), wherein determination is made on whether the key-input at this time is the function key Fnc14 or not. If it is the function key Fnc14 (124-yes), the process sets the long vowel "-" and directs to the next key input passing through the connection point 5 if the same key is continued two (2) times from the previous time (125-yes). If the key inputted at this time is not the function key Fnc14 (125-no), it sets the function mode, and determines to which mode the change to be made depending upon the next input. About this, it was mentioned as the processes after the above-mentioned step (104-yes). If the key inputted at this time is not the function key Fnc14 (124-no), determination is made on whether it is the decide key Ent18 or not. If the key inputted at this time is the decide key Ent18 (128-yes), determination is made on whether Ent18 was inputted twice consecutively or not, and if Ent18 was not inputted consecutively (129-no), the determination of the kana input or the conversion into Chinese character is conducted (131), then the process proceeds to the next letter input through the connection point 5. On the other hand, if it is consecutive inputs of the same key (129-yes), the conversion into Chinese character is carried out (130). The Chinese character conversion is conducted on the cursor area as a target thereof if it is appointed, but is conducted on the other parts not yet converted into Chinese characters as an object thereof if it is not appointed. And, the process proceeds to the next letter input through the connection point 5. If the input key is not the decide key Ent18 (128-no), determination is made on whether it is the soft key R20 or L19 (132).

If it is any one of the above-mentioned keys (132-yes), determination is made on whether the same key is inputted twice consecutively, and the bracket "(" or ")" is set if it is consecutive inputs of the same key(133-yes), but the period "." or comma "," is set if the different key is inputted after the soft key R20 or L19. In this case, consecutive (twice) inputs of the soft key R20 or L19 set the bracket "(" or ")" respectively, and single input of the soft key R20 or L19 followed by an input of the different key sets the period or comma "," respectively.

If the input key at this time is not either one of the soft keys R20 and L19 (132-no), determination is made on whether it is the "←" key 16 or the "→" key 17, through the connection point 6 (136). If the previous input is the function key Fnc14 (137-yes) the cursor is shifted in the direction of the "←" key 16 or the "→" key 17, and the area of shifting thereof is reversed in black and white (138). And, the process proceeds to the next input through the connection point 5. As was described in the above, the area reversed in black and white is called a cursor area, and processing is conducted on this area as a target thereof through the decide key Ent18, etc. If the previous input is not the function key Fnc14 (137-no), since the cursor position was already determined (139-yes), if the input at this time is the "→" key 17 (140-yes), the letter which was inputted at the right-hand side of the cursor is shifted to the right together with the cursor, and at the same time a space is inserted after the cursor is shifted (141). And, the process proceeds to the next input through the connection point 5. If the input at this time is the "←" key 16 (140-no), only the cursor is shifted. If the cursor position is not yet determined (139-yes), the cursor is shifted in the direction of the key inputted. These also proceed to the next input through the connection point 5.

If the key inputted at the present is the clear key (143-yes), if the cursor area is established (144-yes), the established cursor area is deleted, and the letter at the right-hand side of the cursor area is shifted to the left, thereby filling up the area which is deleted (145). And, the process proceeds to the next input through the connection point 5. If the cursor area is not yet set (144-no) but if the letters inputted are already determined (146-yes), the cursor deletes the letter at the left-hand side and shifts to the left by a space of one letter (147). And, the process proceeds to the next input through the connection point 5. If the letters inputted are not yet determined (146-no), the process done just before is deleted and it proceeds to the next input through the connection point 5. If the key inputted at the present is not the clear key (143-no), since it means that it is not any one of those key inputs and it is impossible to occur, however if it occurs, the process proceeds to the next input through the connection point 5, with nothing done.

Explanation will be given on an example of the input of a simple sentence, including a relationship with the letter input mode other than the quasi-alphabetic letter input, by referring to FIG. 11. Now, a case is considered when a message, 「今日は C 3 0 9 H (Today is C309H.) is inputted into the message storage file. Under the waiting screen, "M38" is inputted, so as to turn it into the screen for selecting the letter input method, and the quasi-alphabetic letter input method is selected by means of "upward arrow" key or "downward arrow" key. Then, the screen is turned into the screen of the quasi-alphabetic letter input. Assuming that no letter is inputted before, when keys "k", "y", "o", "u", "h" and "a" are inputted, they are converted into kana, 「きょうは」 and displayed, as shown in the FIG. 11(a). After this, if the decide key Ent18 is inputted two (2) times consecutively, they are converted into Chinese letters. As shown in the FIG. 11(b), a first candidate for the conversion into Chinese character is indicated in black and white inversely at a position where kana (Japanese alphabets) was displayed, and a next candidate of Chinese character is indicated below. The arrow at the left-hand side of the candidate of Chinese character displayed indicates it will be converted into that Chinese character if the arrow in that direction is inputted. In this case, since 「きょう」 means "today", the candidate that includes Chinese characters which means today, namely 「今日」, is selected. When trying to input the alphanumeric next in the portion, which is completed in the Chinese character conversion, the "5" key is inputted next to the function key Fnc14, thereby changing into the mode for inputting the alphanumeric input mode within the quasi-alphabetic letter input mode. In the above-mentioned mode for inputting the alphanumeric, as shown in the FIG. 11(c), the numerals and the alphabets and the marks of four basic calculations (+, −, ×, ÷) are aligned on four (4) lines in the lower side thereof, wherein an alphanumeric or a mark of calculation is selected by designating a line number counted from the top one and a column number counted from the left-hand side.

When trying to input the example mentioned above, keys "2", "3", "1", "3", "1", "0", "1", "9", "2" and "8" are inputted, and then "C309H" is inputted. After this, the decide key Ent18 is inputted, so as to determine it, and the "1" key is inputted next to the function key Fcn. 14, thereby turning back to the "hirakana" mode. And in case of inputting additional hirakana letter 「を」 after "C309H", by inputting "w" and "o", 「を(wo)」 is displayed on the display screen, sequentially, and it is determined. Then, the message is inputted, and then this message is stored in the predetermined storage file.

The input method of the voiced consonant should not be restricted to the combination with the un-voiced consonant corresponding thereto and "p", but it may be the combination with the corresponding un-voiced consonant and a letter other than that, if that combination has no possibility to occur in Japanese language. However, if it is selected within the region of the first consonants mentioned above, it is not preferable since it cannot be distinct from the double consonant. As the letters other than the first consonants, "y" is possible to be confused with the input of the contracted consonant, therefore it is not preferable. Taking the condition mentioned above into the consideration, as the candidates for making up the voiced consonants, there remain "n", "m", "r" and "w". If the letter is "n" for making up the voiced consonant, it is sufficient to input "kna" in the place of the input "kpa", for obtaining the conversion results of No. 4 as shown in FIG. 14, for example.

Applying the manner of thinking mentioned above into the semi-voiced consonants, and assuming that the voice consonant is the un-voiced consonant corresponding to "n" and the half-voiced consonant is "m", then the half-voiced consonant may be obtained by combining the un-voiced consonant corresponding thereto and the "m". For example, for obtaining the conversion result of No. 3 as shown in the FIG. 14, since the un-voiced consonant corresponding thereto is "ha", it is possible to input "hma" in the place of the input "hpa".

With doing so, as was mentioned in the above, the key is not distributed to "p", the quasi-alphabetical letter input is possible by the fourteen (14) pieces of the keys. With this method, since the input operations of the sonant mark and the half-sonant mark, each of which is treated by one letter in the space in conventional method, can be conducted at the same time in this method, the key input can be performed within two (2) times for each of the letters. In this case, the steps (113) and (114), in the flowchart in FIG. 9, determine whether "n" or "m" relates to input of voiced consonant or half-voiced consonant instead of determining whether the input key is "p" or not. Therefore the steps included in determination procedure come to be high in number in the flowchart. However, it does not differ greatly in it's theory, therefore there is no problem in the realization on the terminal apparatus. However, from a viewpoint of the user, she/he must remember which key is for the voiced consonant and which key is for the half-voiced consonant, and might feel somewhat troublesome, therefore it is preferable to distribute "p" to the key, from a viewpoint of practical use thereof.

Other combinations, which differ from that of the embodiment explained in the above, may be possible, and in particular, there is a large number of choices in the functions assigned to the combinations of the function key Fnc14 and other letter keys. For example, in the input method within the alphanumeric input mode, in the place of the embodiment mentioned above, it is also possible to consider provision of a key for changing to the above-mentioned dial key method directly.

In the embodiment mentioned above, the input of the voiced consonant is made by inputting "p" after the first consonant (but, except for "p"), however on the contrary to this, it is possible to input the first consonant (but, except for "p") after the "p".

In the embodiment mentioned in the above, it is constructed, so that the comma "," and the period "." and the brackets "(" and ")" can be inputted through the soft key R20 or L19, however it is also possible to distribute the function for changing to other input modes, etc.

According to the present embodiment, it is possible to obtain the portable telephone apparatus, capable of inputting alphabetic letters, using the fourteen (14) pieces of keys in a similar manner to an ordinary alphabetic input method of Japanese language, and capable of enabling the key operation necessary for inputting the consonant to be equal or less than two (2) times for each letter, thereby being easily operable.

While we have shown and described several embodiments in accordance with our invention, it should be understood that the disclosed embodiments are susceptible of changes and modifications without departing from the scope of the invention. Therefore, we do not intend to be bound by the embodiments shown and described herein, but intend to cover all such changes and modifications falling within the ambit of the appended claims, for example, even if the layout of keys, the display of screen or the process sequences thereof are changed.

What is claimed is:

1. A method for inputting Japanese language, comprising the steps of:
    assigning five (5) alphabetic letters indicative of vowels of Japanese language to five input keys;
    assigning nine (9) alphabetic letters indicative of un-voiced consonants of Japanese language to nine input keys;
    assigning a function for bringing the un-voiced consonant into a voiced consonant, to one of the input keys for the alphabetic letters indicative of the un-voiced consonants; and
    inputting the voiced consonant by combination of key operations of the key indicative of the un-voiced consonant of said consonants, the key assigned to said function of bringing into a voiced consonant, and the key indicative of said vowel.

2. A method for inputting Japanese language, as defined in the claim 1, wherein said alphabetic letter assigned to said function of bringing into voiced consonant is set to a letter different from the nine alphabetic letters indicative of said un-voiced consonants, and is also different from any one of the nine (9) input keys indicative of said un-voiced consonants, whereby an input of half-voiced consonant is conducted by combination of key operations of the key assigned to said function of bringing into a voiced consonant and the key indicative of said vowel.

3. A method for inputting Japanese language, as defined in the claim 1, wherein one of the nine (9) alphabetic letters indicative of said un-voiced consonants is assigned to the alphabetic letter for said function for bringing into a voiced consonant, and
    one letter, being different from the letter of the nine (9) alphabetic letters indicative of said un-voiced consonants, which is assigned to said function for bringing into a voiced consonant, is assigned to a function of bringing into a half-voiced consonant, whereby an input of the half-voiced consonant is conducted by combination of key operations of the key indicative of said un-voiced consonant and the key assigned to said function of bringing into a half-voiced consonant and the key indicative of said vowel.

4. A method for inputting Japanese language, as defined in the claim 1, wherein said alphabets indicative of said vowels of Japanese language are "a", "e", "i", "o" and "u", and the alphabets indicative of the un-voiced consonants within the consonants are "h", "k", "m", "n", "r", "s", "t", "y" and "w".

5. A method for inputting Japanese language, as defined in the claim 2, wherein the alphabet indicative of the consonant of a half-sonant mark is "p", and the voiced consonant is indicated by disposing "p" in a front or a rear of the un-voiced consonant corresponding thereto.

6. A portable mobile unit, comprising:
    an input portion for inputting a letter or a numeral therethrough;
    a display portion for displaying letter information including the numeral inputted through said input portion;
    a processing portion for processing information including the information from said input portion, and for outputting information to said display portion; and
    a memory portion for storing data necessary for the processing in said processing portion, wherein
    said input portion has at least fourteen (14) pieces of input keys;
    five (5) alphabetic letters of indicative vowels of Japanese language are assigned to five (5) input keys of said fourteen (14) pieces of input keys; and
    nine (9) alphabetic letters indicative of un-voiced consonants in consonants of Japanese language are assigned to nine (9) input keys, further comprising:
    an input key, being assigned with one of the alphabets indicative of the un-voiced consonants in the consonants of Japanese language and a function of bringing the un-voiced consonant into a voiced consonant, wherein
    input of the voiced consonant is conducted by combination of key operations of the key indicative of said un-voiced consonant, the key assigned to said function of bringing into a voiced consonant, and the key indicative of said vowel.

7. A portable mobile unit, as defined in the claim 6, wherein said alphabets indicative of said vowels of Japanese language are "a", "e", "i", "o" and "u", the alphabets indicative of the un-voiced consonants within the consonants are "h", "k", "m", "n", "r", "s", "t", "y" and "w", and the alphabet indicative of the consonant of a half-sonant mark is "p", whereby the voiced consonant is indicated by disposing "p" in a front or a rear of the un-voiced consonant corresponding thereto.

8. A portable mobile unit, as defined in the claim 6, wherein the keys indicative of said vowels of Japanese language are aligned on one line.

9. A portable mobile unit, as defined in the claim 6, further comprising at least a key for making determination and a key for making a selection.

10. A portable mobile unit, as defined in the claim 8, wherein the keys indicative of said consonants of Japanese language are aligned on two (2) lines adjacent to the line of the keys indicative of said vowels.

11. A portable mobile unit, comprising:

an input portion for inputting a letter or a numeral therethrough;

a display portion for displaying letter information including the numeral inputted through said input portion;

a processing portion for processing the information including that from said input portion, and for outputting information to said display portion; and a memory portion for storing data necessary for the processing in said processing portion, wherein said input portion has at least fourteen (14) pieces of input keys;

five (5) alphabetic letters of indicative vowels of Japanese language are assigned to five (5) input keys of said fourteen (14) pieces of input keys; and nine (9) alphabetic letters indicative of un-voiced consonants in consonants of Japanese language are assigned to nine (9) input keys;

one of the nine (9) input keys indicative of said un-voiced consonants is assigned to the input key having a function of bringing into voiced consonant; and other one of the nine (9) input keys indicative of said un-voiced consonants than the input key, to which is assigned the function of bringing into a voiced consonant, is assigned to an input key having a function of bringing into a half-voiced consonant;

input of the voiced consonant is conducted by operations of the input key of the alphabetic letter indicative of said un-voiced consonant, the input key assigned to said function of bringing into a voiced consonant, and the input key of the alphabetic letter indicative of said vowel; and input of the half-voiced consonant is conducted by operations of the input key of the alphabetic letter indicative of said un-voiced consonant, the input key assigned to the function of bringing into a half-voiced consonant, and the input key of the alphabetic letter indicative of said vowel.

12. A portable mobile unit, as defined in the claim 11, wherein said alphabets indicative of said vowels of Japanese language are "a", "e", "i", "o" and "u", and the alphabets indicative of the un-voiced consonants within the consonants are "h", "k", "m", "n", "r", "s", "t", "y" and "w".

* * * * *